United States Patent
Jaulin et al.

(10) Patent No.: US 10,812,881 B2
(45) Date of Patent: Oct. 20, 2020

(54) CIRCUIT FOR CONNECTING A LOCAL NETWORK TO AN OPTICAL FIBER THAT MIGHT CONVEY LIGHT SIGNALS COMPLYING WITH DIFFERING OPTICAL COMMUNICATION STANDARDS

(71) Applicant: SAGEMCOM BROADBAND SAS, Rueil Malmaison (FR)

(72) Inventors: Jean-Philippe Jaulin, Rueil Malmaison (FR); Mikaël Hardy, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/548,370

(22) Filed: Aug. 22, 2019

(65) Prior Publication Data
US 2020/0068279 A1 Feb. 27, 2020

(30) Foreign Application Priority Data
Aug. 22, 2018 (FR) ...................... 18 57602

(51) Int. Cl.
H04Q 11/00 (2006.01)
(52) U.S. Cl.
CPC ..... *H04Q 11/0067* (2013.01); *H04Q 11/0003* (2013.01); *H04Q 2011/0079* (2013.01); *H04Q 2011/0088* (2013.01)
(58) Field of Classification Search
None
See application file for complete search history.

(56) References Cited

U.S. PATENT DOCUMENTS

| | | | |
|---|---|---|---|
| 6,848,053 B1 * | 1/2005 | Monzawa | H04B 10/00 380/256 |
| 9,338,530 B2 | 5/2016 | Izenberg et al. | |
| 2009/0245790 A1 * | 10/2009 | Mizutani | H04J 3/0682 398/43 |
| 2011/0103792 A1 | 5/2011 | Kimura | |
| 2018/0157001 A1 * | 6/2018 | Gu | G02B 6/4466 |

OTHER PUBLICATIONS

"10-Gigabit-capable passive optical networks (XG-PON): General requirements", ITU-T Standard, International Telecommunication Union, Geneva, CH, No. G.987.1, 2010, pp. 1-52, 52 pages.

* cited by examiner

*Primary Examiner* — David W Lambert
(74) *Attorney, Agent, or Firm* — Muncy, Geissler, Olds & Lowe, P.C.

(57) ABSTRACT

A connection circuit arranged to connect at least one piece of electrical equipment (12) to an optical fiber (13) that might convey light signals of different wavelengths, the connection circuit comprising a wavelength multiplexer (16) having an upstream port (17) for connection to the optical fiber and a plurality of downstream ports (18, 19), a plurality of optical-electrical interfaces (24, 25) each compatible with at least one optical communication standard and each having both an optical port (26) connected to one of the downstream ports of the wavelength multiplexer and also an electrical port (27), an electrical processor component (35) having a communication port (36) via which the electrical processor component is arranged to emit and/or receive light signals (TXD, RXD), and a switch (45) arranged to connect the communication port of the electrical processor component selectively to an electrical port of one of the optical-electrical interfaces.

12 Claims, 8 Drawing Sheets

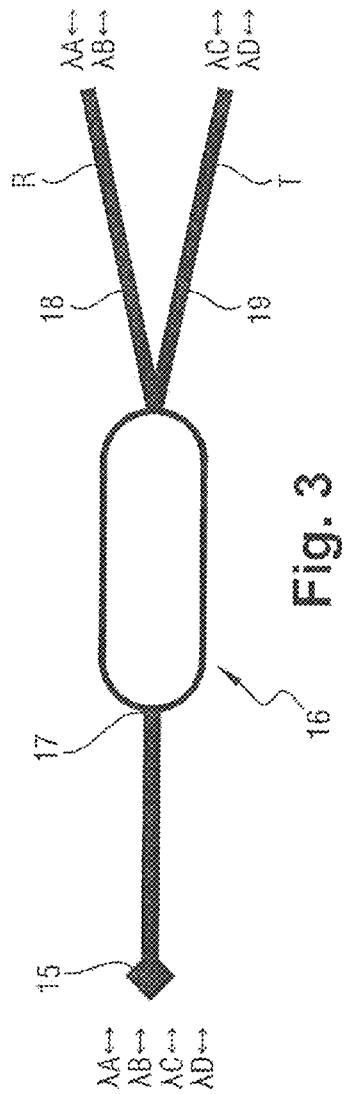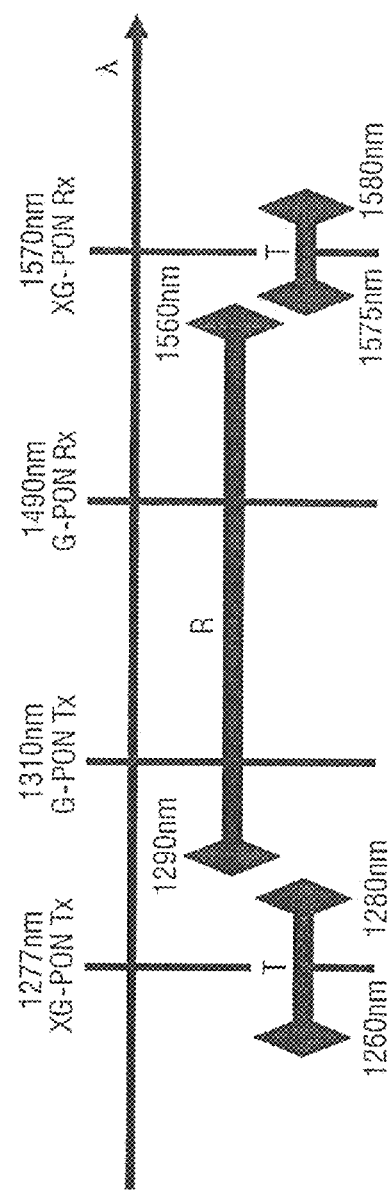

CIRCUIT FOR CONNECTING A LOCAL NETWORK TO AN OPTICAL FIBER THAT MIGHT CONVEY LIGHT SIGNALS COMPLYING WITH DIFFERING OPTICAL COMMUNICATION STANDARDS

The invention relates to the field of circuits for connecting a local network to an optical fiber that might convey light signals in compliance with differing optical communication standards.

BACKGROUND OF THE INVENTION

As a result of fiber to the home (FTTH) networks, numerous subscribers are now benefiting from very broadband Internet access. In FTTH network, the optical fiber goes as far as the subscribers.

It is possible to cause a plurality of optical communication standards to cohabit in a single fiber, and thus to enable an operator to distribute a plurality of services using reduced infrastructure.

With reference to FIG. 1, such reduced infrastructure that enables the Internet to be taken to subscribers 1, comprises a plurality of terminating pieces of equipment 2 of the optical line terminal (OLT) type, a wavelength coupling device 3, and a subscriber optical line coupling device 4.

By way of example, these optical communication standards include the gigabit-passive optical network (G-PON) standard that can transport 2.5 gigabits per second (Gbps) in the downlink direction and 1.2 Gbps in the uplink direction. The G-PON standard is described at hardware level and at protocol level in ITU-T standard G.984 and in each of its sub-publications. There is also the extended gigabit passive optical network (XG-PON) standard that can transport 10 Gbps in the downlink direction and 2.5 Gbps in the uplink direction. The XG-PON standard is described in ITU-T standard G.988.

Each of those optical communication standards uses light fluxes at wavelengths ($\lambda$) that are defined specifically in the applicable standard. Thus, the G-PON standard is based on light signals in the downlink direction having a wavelength $\lambda 2$ equal to 1490 nanometers (nm) and on light signals in the uplink direction having a wavelength $\lambda 1$ equal to 1310 nm. The XG-PON standard uses light signals in the downlink direction having a wavelength $\lambda 4$ that is equal to 1577 nm, and light signals in the uplink direction having a wavelength $\lambda 3$ that is equal to 1270 nm.

There also exist other optical communication standards using light signals based on other wavelengths or on "combs" of wavelengths (the light signal in a given direction is made up of a set of optionally combined signals that are distributed over a plurality of wavelengths).

Each subscriber 1 has an Internet gateway 5 with an optical-electrical interface 6 enabling light signals to be exchanged by applying the optical communication standard. An optical-electrical interface 6 conventionally comprises an emitter comprising a laser diode that generates light signals from electrical signals containing information for transmission, and a receiver comprising a photodiode for converting received light signals into usable electrical signals.

The laser diode generates very pure single-frequency light signals. Furthermore, in order to protect the receiver from other light signals present in the optical fiber, it is common practice to use an optical filter that corresponds exactly to the wavelength of the light signals that are to be received.

These components are commonly grouped together within a macro-component known as a bidirectional optical subassembly (BOSA) that is designed specifically to interface one particular optical communication standard and thus one pair of wavelengths, thereby being protected from and incompatible with any other optical communication standard.

It can be understood that each gateway is adapted to communicate using a single optical communication standard, and that it would appear to be extremely complex to enable the subscriber or the operator to select some other optical communication standard from those present on the optical fiber, but without changing gateway.

It should be observed that the standards defining optical communication were defined on the basis of real-life situations in the field in terms of available components and the associated performance, and they therefore define performance pushed to the limit, in particular in terms of optical range, that leave practically no latitude to component manufacturers in terms of improving sensitivity.

OBJECT OF THE INVENTION

An object of the invention is to make it possible, while using a single Internet gateway, to select which optical communication standard to use from among a plurality of standards present on a single optical fiber connected to the gateway.

SUMMARY OF THE INVENTION

In order to achieve this object, there is provided a connection circuit arranged to connect at least one piece of electrical equipment situated downstream from the connection circuit to an optical fiber situated upstream from the connection circuit and that might convey light signals of different wavelengths and in compliance with different optical communication standards, the connection circuit comprising a wavelength multiplexer having an upstream port for connection to the optical fiber and a plurality of downstream ports, a plurality of optical-electrical interfaces each compatible with at least one optical communication standard and each having both an optical port connected to one of the downstream ports of the wavelength multiplexer and also an electrical port, an electrical processor component having a communication port via which the electrical processor component is arranged to emit and/or receive light signals, and a switch controlled by the electrical processor component and arranged to connect the communication port of the electrical processor component selectively to an electrical port of one of the optical-electrical interfaces.

The connection circuit of the invention may be integrated in an Internet gateway and serve to connect the electrical equipment, e.g. forming part of a subscriber's local network, selectively to one of the optical communication standards present on the optical fiber.

It should be observed that the connection circuit is simple to implement, that it requires a small number of components, and that it is therefore inexpensive.

There is also provided an Internet gateway including a connection circuit as described above.

There is also provided a communication management method performed in a connection circuit as described above, the method including a probe stage comprising steps, that are performed in succession for each optical-electrical interface, of attempting to detect the presence on the optical fiber of downlink light signals in compliance with an optical communication standard with which said optical-electrical interface is compatible, a designation stage comprising the step of designating a particular optical communication standard from a result of the probe stage, and a selection stage comprising the step of the electrical processor component operating the switch so as to connect the communication port of the electrical processor component to the electrical port of an optical-electrical interface that is compatible with the particular optical communication standard that has been designated.

There is also provided a computer program comprising instructions enabling an electrical processor component of an Internet gateway to perform a communication management method as described above.

There are also provided storage means, characterized in that they store a computer program comprising instructions enabling an electrical processor component of an Internet gateway to perform a communication management method as described above.

The invention can be better understood in the light of the following description of a particular, non-limiting embodiment of the invention.

BRIEF DESCRIPTION OF THE DRAWINGS

Reference is made to the accompanying drawings, in which:

FIG. 3 shows a wavelength multiplexer;
FIG. 4 shows the operation of the wavelength multiplexer.

DETAILED DESCRIPTION OF THE INVENTION

Figure 1:
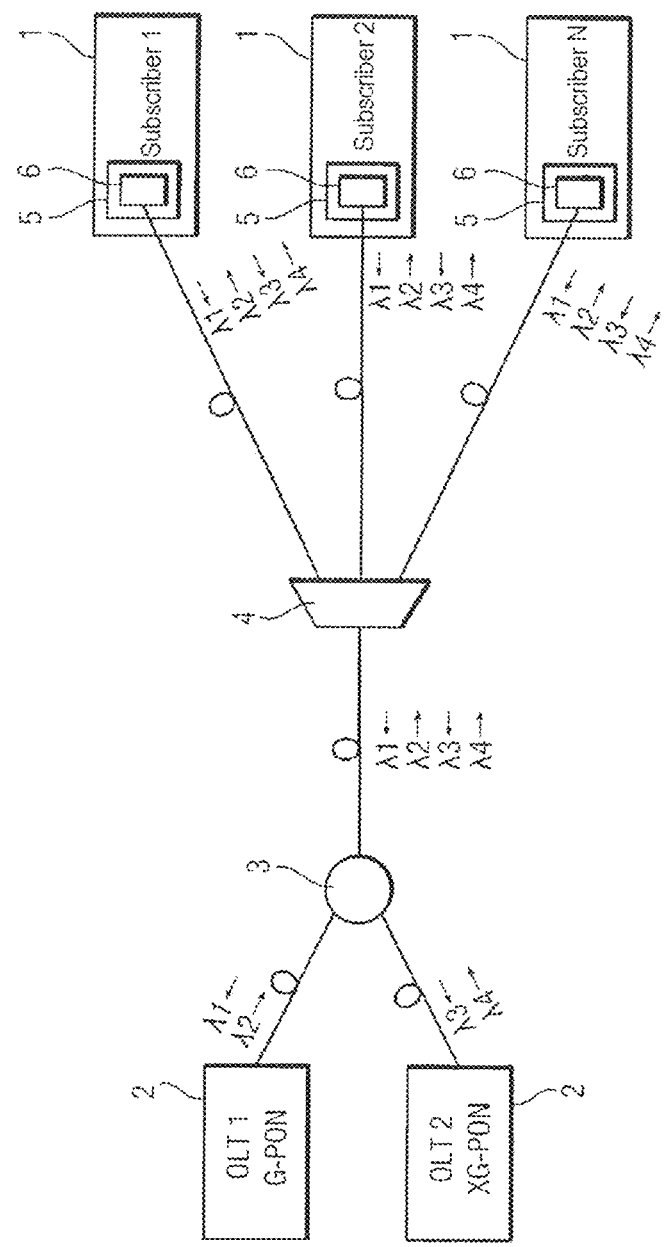
FIG. 1 shows a prior art optical communication network.
Figure 2:
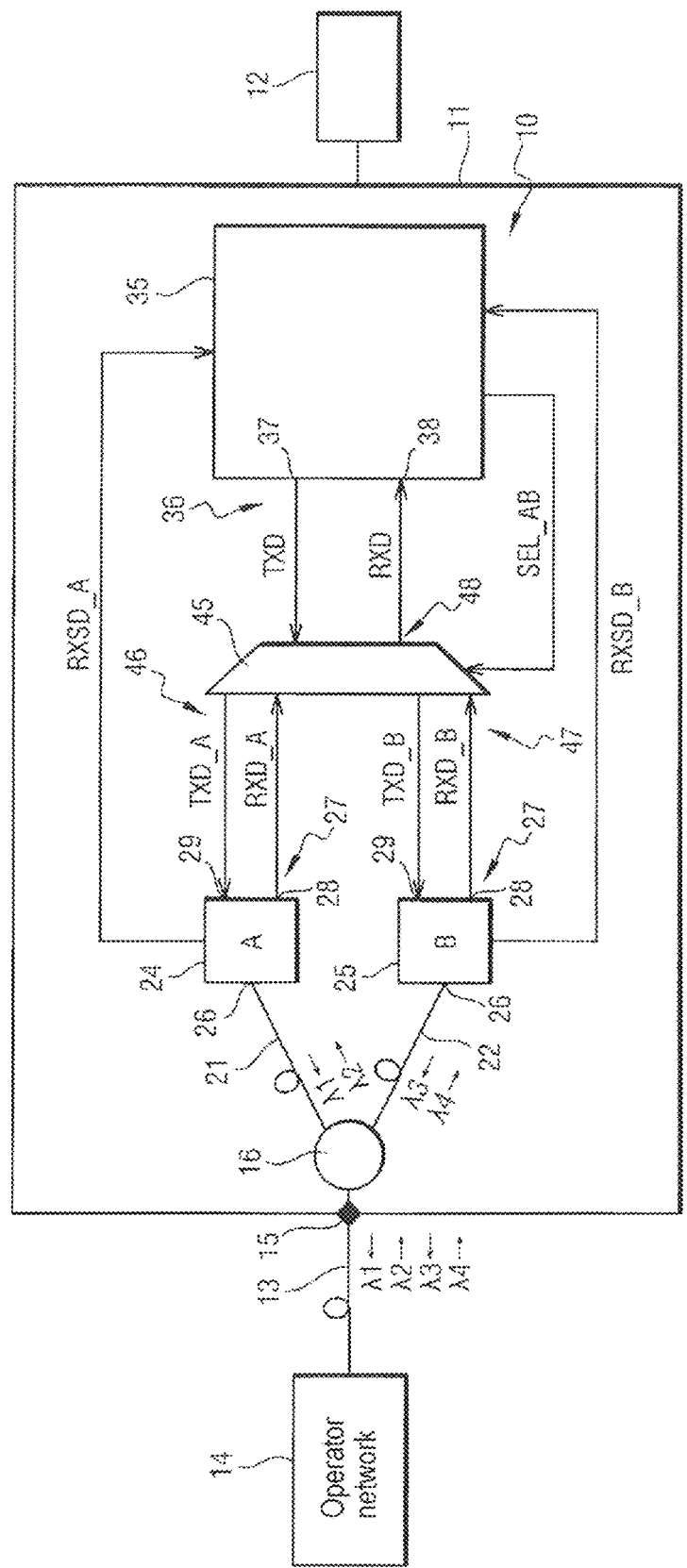
FIG. 2 shows a connection circuit of the invention.

With reference to FIG. 2, the connection circuit 10 of the invention is integrated in an Internet gateway 11. The connection circuit 10 is used to connect a subscriber's local network having at least one piece of electrical equipment 12 and situated downstream from the connection circuit 10 to an optical fiber 13 situated upstream from the connection circuit 10. The optical fiber 13 is also connected to an operator network 14 situated upstream from the optical fiber 13 and having a plurality of OLT type pieces of terminating equipment. The term "upstream" is used herein to mean on the operator network side, and the term "downstream" is used herein to mean on the subscriber side.

The optical fiber 13 might be conveying light signals of different wavelengths and complying with different optical communication standards. Herein, the optical communication standards comprise the G-PON standard, the XG-PON standard, and the XGS-PON standard.

The connection circuit 10 begins with an optical coupler 15 into which the optical fiber 13 is plugged.

With reference to FIG. 3, the connection circuit 10 also has a wavelength multiplexer 16.

The wavelength multiplexer 16 has an upstream port 17 connected to the optical coupler 15 and thus to the optical fiber 13, and a plurality of downstream ports, in this example a first downstream port 18 and a second downstream port 19.

The wavelength multiplexer 16 serves to separate downlink light signals conveyed over the optical fiber 13 into downlink light signals conveyed on a branch T and downlink light signals conveyed on a branch R. The wavelength multiplexer 16 also serves to combine uplink light signals conveyed by the branch T and by the branch R in order to obtain uplink light signals conveyed by the optical fiber 13.

In this example, the branch R is connected to a first intermediate fiber 21 that is connected to the first downstream port 18 of the wavelength multiplexer 16. The branch R transports at least the wavelengths 1310 nm and 1490 nm corresponding to the G-PON optical communication standard. The branch T is connected to a second intermediate fiber 22 that is connected to the second downstream port 19 of the wavelength multiplexer 16. The branch T transports at least the wavelengths 1270 nm and 1577 nm corresponding to the XG-PON optical communication standard.

By way of example, the component used has the reference WMMSAMGXG-PONB00 from the manufacturer Optiworks, having the characteristics that are shown in FIG. 4. By means of internal reflection, this component allows light signals of the G-PON system (reflection range 1290 nm to 1560 nm), to pass in both directions over the branch R (connected to the first intermediate fiber 21) with an insertion loss limited to 0.4 decibels (dB). By transmission, this component also allows light signals of the XG-PON system (transmission ranges 1260 nm to 1280 nm and 1575 nm to 1580 nm) to pass in both directions over the branch T (connected to the second intermediate fiber 22) with insertion loss limited to 0.7 db.

The component used could equally well have the reference WMMSAMGXG-PONA00 from the manufacturer Optiworks. By internal reflection, this component allows light signals of the XG-PON system (reflection ranges 1260 nm to 1280 nm and 1525 nm to 1620 nm) to pass in both directions on the branch R (thus connected to the second intermediate fiber 22) with insertion loss limited to 0.4 dB. By transmission, this component also allows light signals of the G-PON system (transmission ranges 1290 nm to 1330 nm and 1480 nm to 1500 nm) to pass in both directions over the branch T (thus connected to the first intermediate fiber 21) with insertion loss limited to 0.7 dB.

Naturally, there exist other possible implementations for such a wavelength multiplexer, providing the transmission and reflection ranges are selected to correspond to the wavelengths that are to be separated.

It should be observed that using a conventional optical coupler cannot be envisaged since such a coupler, with divides the light signal into a plurality of portions, gives rise to significant loss that is not compatible with the components used. For example a "1-to-2" coupler introduces loss of more than 3 dB even though the G-PON standard requires a minimum receive level of −27 dB relative to one milliwatt (dBm) at the optical coupling of the terminal, and existing receiver components have a sensitivity limit lying in the range −28 dBm to −29 dBm.

Likewise, using an optical switch, for the purpose of switching all of the downlink light signals conveyed on the optical fiber, is difficult to envisage because of cost.

The connection circuit 10 also has a plurality of optical-electrical interfaces, specifically a first optical-electrical interface 24 and a second optical-electrical interface 25. The first optical-electrical interface 24 and the second optical-electrical interface 25 each comprise an optical port 26 and an electrical port 27, itself comprising both an emission access 28 and a reception access 29.

The optical port 26 of the first optical-electrical interface 24 is connected to the first downstream port 18 of the wavelength multiplexer 16 (via the first intermediate fiber 21), and the optical port 26 of the second optical-electrical interface 25 is connected to the second downstream port 19 of the wavelength multiplexer 16 (via the second intermediate fiber 22).

The first optical-electrical interface 24 is compatible with the G-PON standard and the second optical-electrical interface 25 is compatible with the XG-PON standard.

Figure 5:
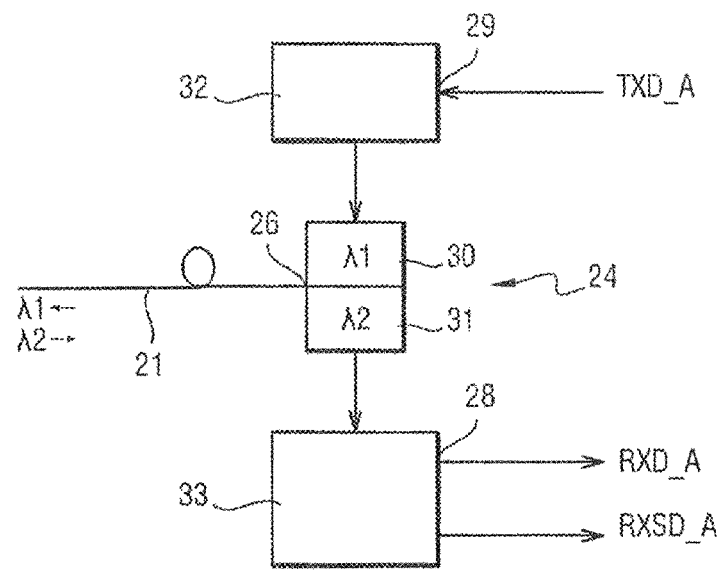
FIG. 5 shows an optical-electrical interface of the connection circuit.

With reference to FIG. 5, there follows a description of the first optical-electrical interface 24, it being understood that the second optical-electrical interface 25 is similar but adapted to the characteristics of the XG-PON standard.

The first optical-electrical interface 24 has a laser diode 30, a photoreceiver, specifically a photodiode 31, a first matching circuit 32, and a second matching circuit 33.

Via the reception access 29 of the electrical port 27, the first matching circuit 32 receives electrical signals TXD_A corresponding to data for transmission to the operator network 14 via the first intermediate fiber 21 and the optical fiber 13. The first matching circuit 32 controls (drives) the laser diode 30 so that it produces uplink light signals representative of the electrical signals TXD_A and containing the data that is to be transmitted. The uplink light signals possess an uplink wavelength that lies within a predetermined range of uplink wavelengths. The predetermined range of uplink wavelengths is associated with the first optical-electrical interface 24 and corresponds to the characteristics of the G-PON standard. In this example, the uplink wavelength is equal to 1310 nm.

Via the optical port 26, the photodiode 31 receives downlink light signals coming from the operator network 14 and having a downlink wavelength that lies within a predetermined range of downlink wavelengths. The predetermined range of downlink wavelengths is associated with the first optical-electrical interface 24 and corresponds to the characteristics of the G-PON standard. In this example, the downlink wavelength is equal to 1490 nm.

The photodiode 31 transforms the downlink light signals into electrical signals that are shaped by the second matching circuit 33 in order to obtain electrical signals RXD_A. The electrical signals RXD_A are transmitted by the second matching circuit 33 via the emission access 28 of the electrical port 27 of the first optical-electrical interface 24.

Advantageously, the second matching circuit 33 includes a device for detecting the presence on the optical fiber 13 of downlink light signals having a downlink wavelength lying in the predetermined range of downlink wavelengths associated with the first optical-electrical interface 24.

When such downlink light signal possess power that is greater than its predetermined sensitivity threshold, the first optical-electrical interface 24 produces a presence signal RXSD_A indicating that said downlink light signals are present. The presence signal RXSD_A is put into a predefined state (e.g. into a logic state equal to 1).

In this example, the laser diode 30 and the photodiode 31, together with other components associated with shaping the electrical signals and not described herein, are all integrated in a macrocomponent, e.g. a BOSA having the reference MB374-45-N4-GK-BW-M from the manufacturer Mentech, or indeed a component having the reference PLDM586-428 from the manufacturer Accelink, or any equivalent component. The first matching circuit 32 and/or the second matching circuit 33 for shaping the signals may be integrated in a model of reference MO2099 from the manufacturer Macom, or indeed in a model of reference BCM68901 from the manufacturer Broadcom, or in any equivalent model.

The connection circuit 10 also has an electrical processor component.

In this example, the electrical processor component is a processor 35, however it could be some other component, e.g. a microcontroller, a field programmable gate array (FPGA), an application specific integrated circuit (ASIC), etc. The processor 35 is adapted to execute instructions of a program in order to perform the tasks to which it is dedicated.

The processor 35 serves to manage the connection circuit 10.

Figure 6:
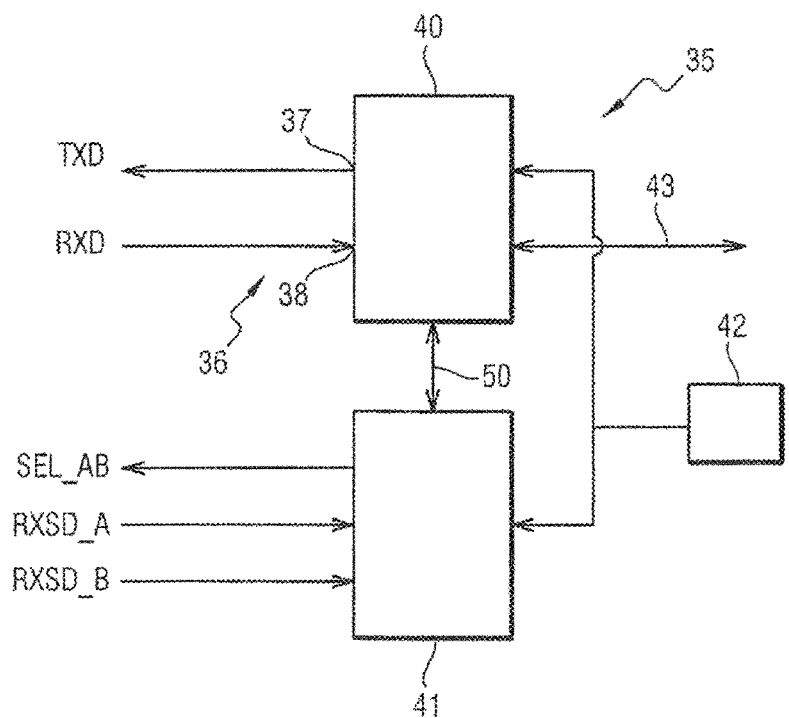
FIG. 6 shows an electrical processor component of the connection circuit.

With reference to FIG. 6, the processor 35 has a communication port 36 having an emission access 37 and a reception access 38, a protocol manager 40, a management module 41, and a non-volatile memory 42.

The protocol manager 40 is connected to the communication port 36. The protocol manager 40 uses instructions stored in the non-volatile memory 42 to implement the protocol portion corresponding at least to one optical communication standard that might be present on the fiber 13.

The Internet gateway 11 thus acts via the communication link 43 and the processor 35 to put the subscriber's data needs into communication with the services made available by the operator over the operator network 14. By way of example, the communication link 43 is an Ethernet link.

In particular, the protocol manager 40 produces the electrical signals TXD via the emission access 37 of the communication port 36 and receives the electrical signals RXD via the reception access 38 of the communication port 36.

The management module 41 receives the presence signal RXSD_A transmitted by the first optical-electrical interface 24 and the presence signal RXSD_B transmitted by the second optical-electrical interface 25, and it generates a selection signal SEL_AB.

The connection circuit 10 also has a switch 45.

The switch 45 has a first upstream port 46, a second upstream port 47, and a downstream port 48.

The first upstream port 46 of the switch 45 is connected to the electrical port 27 of the first optical-electrical interface 24. The second upstream port 47 of the switch 45 is connected to the electrical port 27 of the second optical-electrical interface 25. The downstream port 48 of the switch 45 is connected to the communication port 36 of the processor 35.

The switch 45 is controlled by the processor 35, which is arranged to connect the communication port 36 of the processor 35 selectively to the electrical port 27 of the first optical-electrical interface 24 or to the electrical port 27 of the second optical-electrical interface 25. The switch 45 is controlled by means of the selection signal SEL_AB that is transmitted by the processor 35 of the switch 45. The switch 45 switches the electrical signals TXD_A, RXD_A, TXD_B, RXD_B (and TXD and RXD), which are fast electrical signals.

When the switch 45 connects the communication port 36 of the processor 35 to the electrical port 27 of the first optical-electrical interface 24, which corresponds for example to the selection signal SEL_AB having a logic state of 1, the electrical signals TXD are directed to the reception access 29 of the electrical port 27 of the first optical-electrical interface 24 and thus become the electrical signals TXD_A, and the electrical signals RXD_A are directed to the reception access 38 of the communication part 36 of the processor 35 and thus become the electrical signals RXD.

When the switch 45 connects the communication port 36 of the processor 35 to the electrical port 27 of the second optical-electrical interface 25, which corresponds for example to the selection signal SEL_AB having a logic state equal to 0, the electrical signals TXD are directed to the reception access 29 of the electrical port 27 of the second optical-electrical interface 25 and thus become the signals TXD_B, and the electrical signals RXD_B are directed to the reception access 38 of the communication port 36 of the processor 35 and thus become the electrical signals RXD.

The characteristics of the switch 45 are selected in terms of bandwidth, so as to avoid any degradation of the electrical signals. For example, the switch 45 used for the transmission portion may have a bandwidth greater than or equal to 1.25 gigahertz (GHz) in order to avoid degrading the electrical signals used in the uplink direction of G-PON (1.2 Gbps) and of XG-PON (2.5 Gbps). In the same example, the switch 45 used for the reception portion needs to have a bandwidth greater than or equal to 5 GHz in order to avoid degrading the electrical signals used in the downlink direction of G-PON (2.5 Gbps) and of XG-PON (10 Gbps).

By way of example, a switch of reference PI3DBS12212A from the manufacturer Pericom or an equivalent model could be used for performing this function.

By using the connection circuit 10 of the invention, the Internet gateway 11 is thus capable of communicating with the operator network 14 by means of a plurality of optical communication standards on a single optical fiber 13. It is therefore necessary to select the correct optical communication standard for use.

In general, when a subscriber takes out an Internet subscription, the subscriber chooses a particular offer having characteristics that are known and defined (bandwidth, optical communication standards, data volume, services, . . . ). Over time, offers may change and the subscriber may thus cause the characteristics of the subscription to change.

In the same manner, over time, the operator may cause the infrastructure to change and may add or replace optical communication standards on the optical fiber that goes to a subscriber's home.

In both situations, it is advantageous to perform a communication management method making it possible for the Internet gateway 11 to use the protocol associated with the optical communication standard that corresponds to the choice established between the operator and the subscriber, or to use the protocol that provides the best performance if no choice has been made.

The communication management method is performed in the connection circuit 10. The communication management method is performed when the Internet gateway 11 is switched on, or as a result of a restart imposed by the operator following a maintenance operation, or indeed following updating of the Internet gateway 11.

The stages and the steps of this communication management method are described below with reference to FIGS. 7 to 10.

Figure 7:
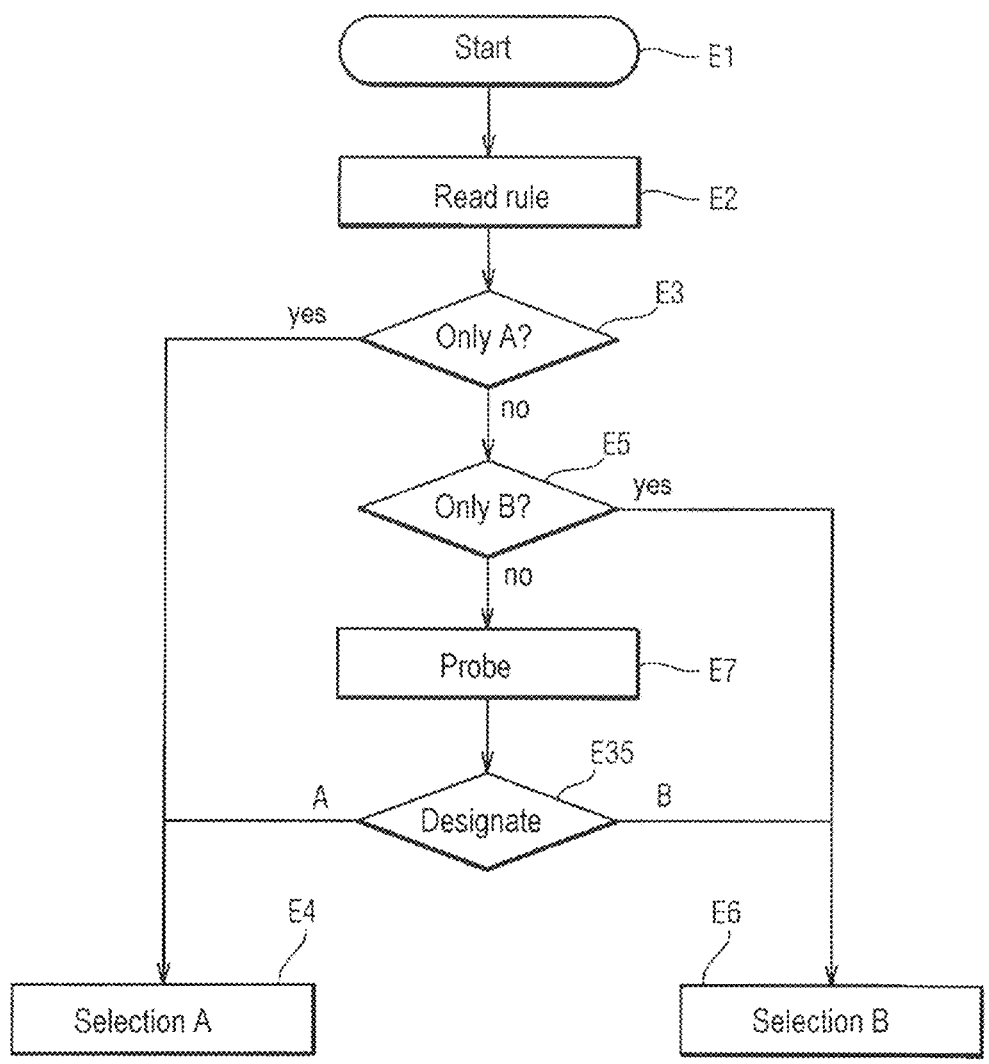
FIG. 7 shows the stages of a communication management method performed in the connection circuit.

With reference to FIG. 7, the communication management method begins with a start step E1.

Thereafter, the communication management method has a read stage E2. This read stage comprises a step of verifying whether a connection rule specifying a single optical communication standard for use is stored in the non-volatile memory 42 of the processor 35.

This connection rule may be loaded during manufacture of the Internet gateway 11, or it may be injected by the operator during earlier use while the Internet gateway 11 was in communication with the operator network 14. This remote configuration operation is commonly performed using the standardized TR069 protocol.

In this example, it is verified whether only the G-PON standard is to be used (step E3). If so, the communication management method has a selection stage E4 that comprises the step of the processor 35 operating the switch 45 so as to select the first optical-electrical interface 24 that is compatible with the G-PON standard. The switch 45 connects the communication port 36 of the processor 35 to the electrical port 27 of the first optical-electrical interface 24.

It is also verified whether only the XG-PON standard is to be used (step E5). If so, the communication method has a selection stage E6 that comprises the step of causing the processor 35 to operate the switch 45 so as to select the second optical-electrical interface 25 that is compatible with the XG-PON standard. The switch 45 connects the communication port 36 of the processor 35 to the electrical port 27 of the second optical-electrical interface 25.

Provision may be made to allow the Internet gateway 11 to designate a particular optical communication standard from among those potentially present on the optical fiber 13. Under such circumstances, after the read stage, the communication method includes a probe stage E7 for probing the optical fiber 13 in order to detect the various optical communication standards that are present.

The probe stage E7 begins with using the various optical-electrical interfaces present in the connection circuit 10 of the Internet gateway 11 to test in succession for the presence of optical communication standards having known characteristics.

The optical communication standards on the optical fiber are arranged in such a manner that the gateway is slaved to the OLT to which it connects. In other words, the OLT continuously broadcasts light signals containing all of the data needed for all subscribers, together with synchronization data and control data. The Internet gateway 11 must begin by detecting the signals transmitted by the OLT (presence signal RXSD), and then synchronize itself on them (electrical signals RXD) prior to being capable of understanding and executing the operations imposed by the control data. The Internet gateway 11 transmits uplink light signals to the OLT as generated from the electrical signals TXD only when the OLT requires them. Outside such periods (bursts), the Internet gateway should remain silent and not transmit any light signals.

The probe stage comprises steps that are performed in succession for each optical-electrical interface in order to detect the presence on the optical fiber of downlink light signals combined with the optical communication standard that is compatible with said optical-electrical interface.

Figure 8:
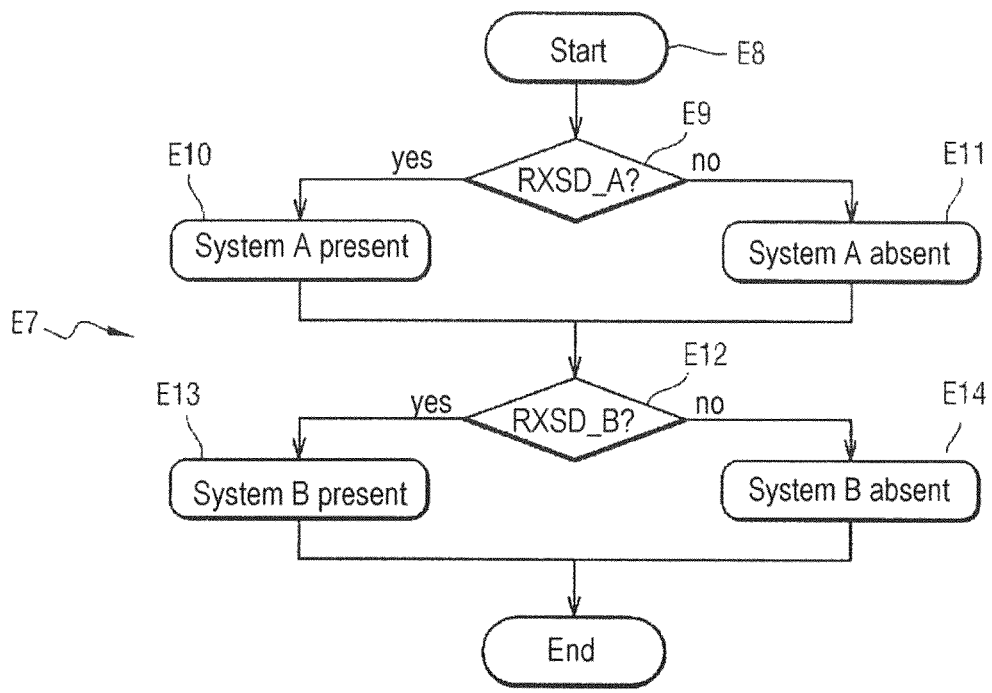
FIG. 8 shows steps of a probe stage.

Thus, with reference to FIG. 8, after a start step E8, the probe stage E7 includes a step of reading the presence signal RXSD_A (step E9). If the presence signal RXSD_A is in a state representative of downlink light signals being present that comply with the G-PON standard, then the processor 35 deduces that the G-PON standard is present on the optical fiber 13 (step E10). Otherwise, the processor deduces that the G-PON standard is absent (step E11).

Thereafter, the probe stage includes a step of reading the presence signal RXSD_B (step E12). If the presence signal RXSD_B is placed in a state representative of the presence of the downlink light signals in compliance with the XG-PON standard, then the processor 35 deduces that the XG-PON standard is present on the optical fiber 13 (step E13). Otherwise, the processor 35 deduces that the XG-PON standard is absent (step E14).

Nevertheless, it should be observed that there exist various optical communication standards that make use of light signals having wavelengths that are identical but for which other characteristics are different. For example, the XG-PON and the extended gigabit symmetrical passive optical network (XGS-PON) standards share the same wavelengths (1270 nm in the uplink direction and 1577 nm in the downlink direction). These standards also share bandwidth characteristics and protocol characteristics in the downlink direction (10 Gbps), but in the uplink direction, the XGS-PON standard provides a bandwidth of 10 Gbps instead of the bandwidth of 2.5 Gbps provided by the XG-PON system. Under such circumstances, the probe needs to be extended to be capable of distinguishing between the optical communication standards.

For this purpose, after the presence signal RXSD enables the presence of downlink light signals to be recognized at a wavelength that is capable of supporting a plurality of optical communication standards, it can be advantageous to proceed with physical recognition of the optical communication standard.

Figure 9:
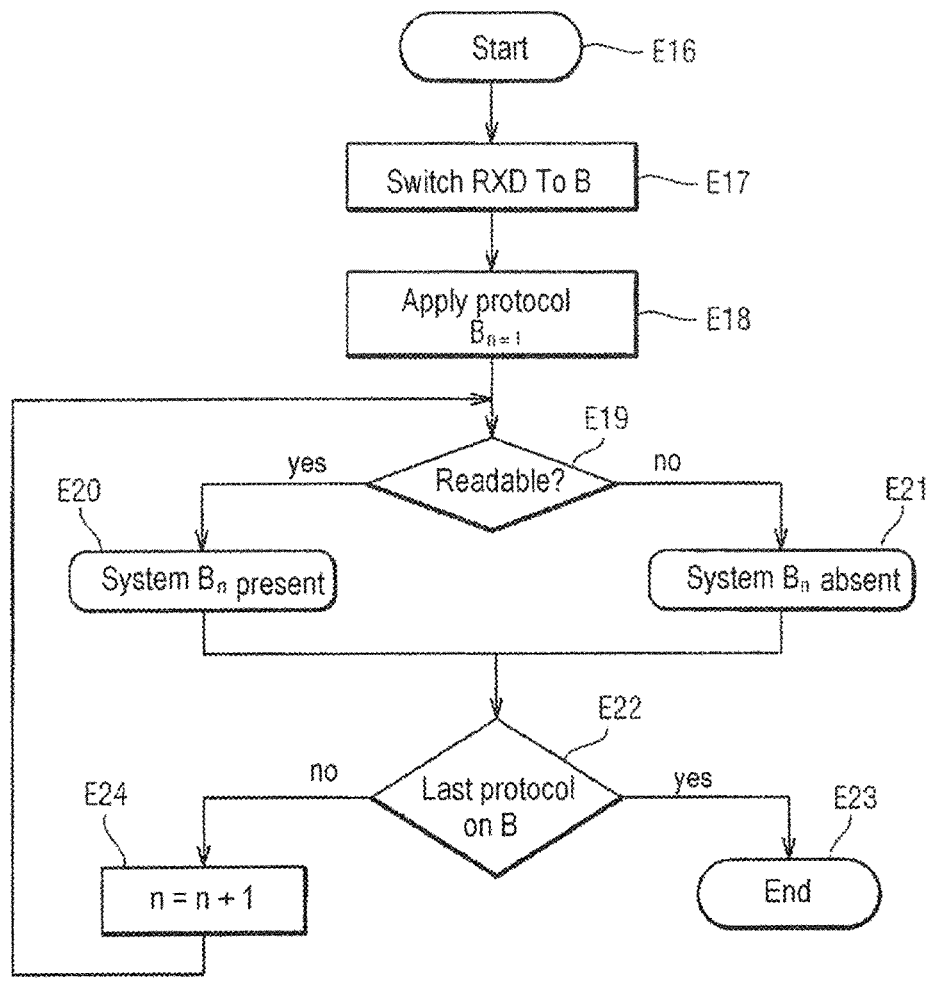
FIG. 9 shows steps of a first additional probe stage.

With reference to FIG. 9, if downlink light signals are detected that are potentially in compliance with a plurality of optical communication standards, the probe stage E7 further includes a first additional probe stage comprising steps, that are performed in succession for each of said optical communication standards, of attempting to read electrical signals representative of the downlink light signals in compliance with said optical communication standard, so as to determine the correct optical communication standard with which the downlink light signals comply.

The first additional probe stage includes a start stage E16. Thereafter, if the presence signal RXSD_B is put into the state representing the presence of a downlink light signal in compliance with the XG-PON standard, the first additional probe stage includes the step of connecting the communication port 36 of the processor 37 to the electrical port 27 of the second optical-electrical interface 25: the electrical signals RXD are switched to the second optical-electrical interface 25 (step E17).

Thereafter, the management module 41 of the processor 35 uses internal signals 50 (shown in FIG. 6) to cause the protocol manager 40 to apply to the electrical signals RXD the protocol that is associated with the first optical communication standard with which the downlink light signals comply (step E18).

The variable n is initialized to 1.

The protocol manager 40 then uses the internal signals 50 to report success or failure of the attempted recognition to the management module 41.

It is verified whether the electrical signals RXD are readable by the protocol of the first optical communication standard (step E19). If so, it is detected that this standard is present on the optical fiber 13 (step E20). Otherwise, it is detected that this standard is absent (step E21).

It is verified whether the first optical communication standard is the last potentially compatible standard (step E22).

If so, the first additional probe stage comes to an end (step E23).

Otherwise, the variable n is incremented (step E24) and the above steps are repeated for the second optical communication standard, for the third optical communication standard, etc. . . . , until reaching the last potentially compatible optical communication standard.

It is also possible to attempt to set up a complete connection with the OLT by using the entire protocol, after the protocol manager has managed to recognize the synchronization and control characteristics that enable it to validate the physical presence of the optical communication standard. This makes it possible to verify completely the validity of the link and of authorizations between the user's Internet gateway 11 and the corresponding OLT used by the operator.

Thus, if downlink light signals potentially in compliance with a plurality of optical communication standards are detected, the probe stage E7 includes a second additional probe stage comprising steps that are performed in succession for each of said optical communication standards, of attempting to establish a connection in compliance with said optical communication standard, between the processor and an OLT situated upstream from the optical fiber so as to determine the correct optical communication standard with which the downlink light signals comply.

Figure 10:
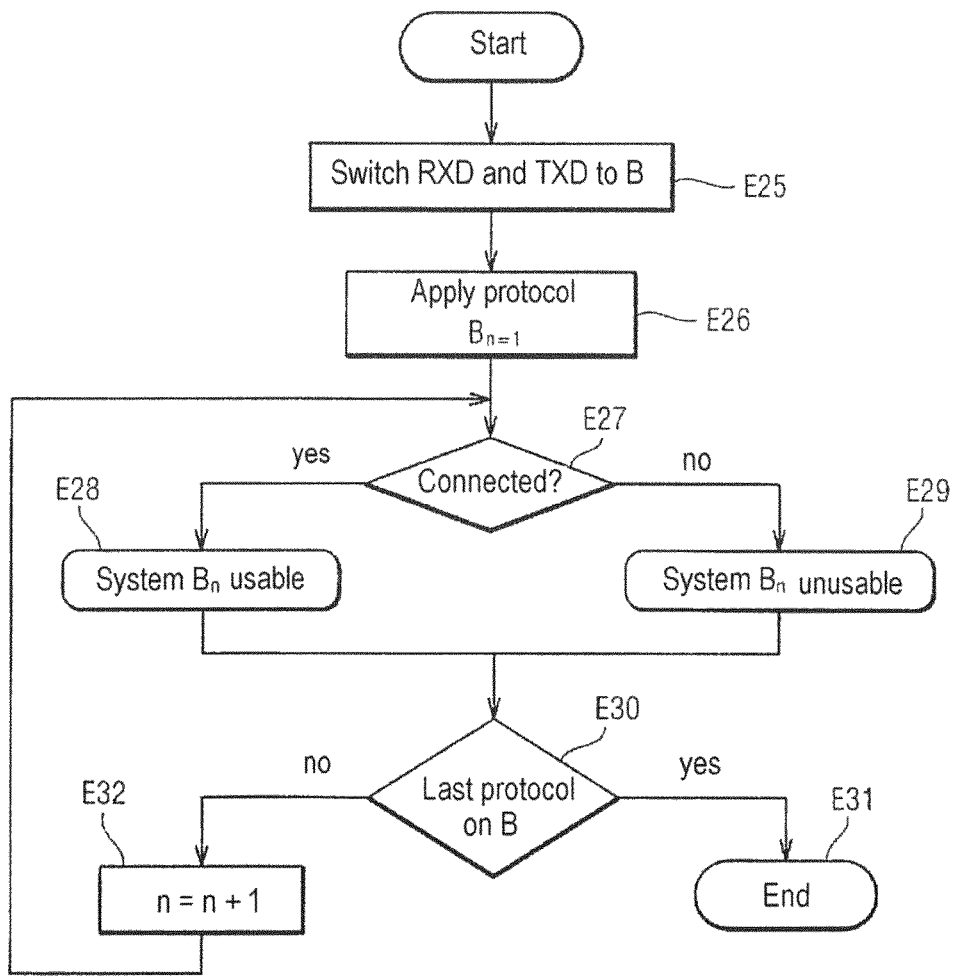
FIG. 10 shows steps of a second additional probe stage.

With reference to FIG. 10, if the presence signal RXSD_B is placed in the defined state representing the presence of a downlink light signal in compliance with the XG-PON standard, the second additional probe stage includes the step of connecting the communication port 36 of the processor 35 to the electrical port 27 of the second optical-electrical interface 25: the electrical signals RXD and TXD are switched to the second optical-electrical interface 25 (step E25).

Thereafter, the management module 41 of the processor 35 uses the internal signals 50 to cause the protocol manager 40 to apply to the electrical signals RXD the protocol that is associated with the first optical communication standard with which the downlink light signals comply (step E26).

The variable n is initialized to 1.

The protocol manager 40 then uses the internal signals 50 to report the success or failure of the attempt at connection to the management module 41.

It is verified whether a connection has been set up using the protocol of the first optical communication standard (step E27). If so, it is detected that this standard is usable on the optical fiber 13 (step E28). Otherwise, it is detected that this standard is not usable (step E29).

It is verified whether the first optical communication standard is the last potentially compatible standard (step E30).

If so, the second additional probe stage comes to an end (step E31).

Otherwise, the variable n is incremented (step E32) and the above steps are repeated for the second optical communication standard, for the third optical communication standard, etc. . . . , until reaching the last potentially compatible optical communication standard.

For each optical-electrical interface, exiting the probe stage E7 thus includes information describing the presence or absence of downlink light signals revealing the presence of at least one optical communication standard corresponding to that wavelength, possibly with information giving a list of the optical communication standards that have been recognized from their synchronization signals and protocols, and possibly also information giving a list of the optical communication standards that have successfully enabled a physical connection to be made with the operator's OLT.

Thereafter, with reference once more to FIG. 7, the communication method includes a selection stage (step E35).

On the basis of information coming from the probe stage, it is possible to designate a standard.

Specifically, all of the optical communication standards that are present and potentially usable are known.

The native bandwidth characteristics of each of the optical communication standards are defined, so it is easy to classify the optical communication standards that are detected during the probe stage as a function of their bandwidths.

The designation stage thus comprises the step of designating one particular optical communication standard from the result of the probe stage.

Thereafter, the communication method includes selection stages E4 and E6 that consist in connecting the communication port of the processor to the electrical port of the optical-electrical interface that is compatible with the G-PON or XG-PON standards.

For these selection stages, the management module 41 of the processor 35 uses the selection signal SEL_AB to switch the electrical signals RXD_A or RXD_B and TXD_A or TXD_B of the selected optical-electrical interface to the electrical signals RXD and TXD of the processor. At the same time, the management module 41 uses the internal signals 50 to cause the protocol manager 40 to execute the designated protocol, thereby setting up communication with the OLT.

The switch 45 is thus controlled by the processor 35 in order to select the optical-electrical interface that is compatible with the optical communication standards that has been selected.

Naturally, the invention is not limited to the embodiment described, but covers any variant coming within the ambit of the invention as defined by the claims.

The description herein states that the connection circuit comprises a first optical-electrical interface 24 compatible with the G-PON optical communication standard and a second optical-electrical interface 25 compatible with the XG-PON optical communication standard. Naturally, the connection circuit could have other optical-electrical interfaces, e.g. a third optical-electrical interface compatible with the XGS-PON optical communication standard.

The invention claimed is:

1. A connection circuit arranged to connect at least one piece of electrical equipment situated downstream from the connection circuit to an optical fiber situated upstream from the connection circuit and that conveys light signals of different wavelengths and in compliance with different optical communication standards, the connection circuit comprising a wavelength multiplexer having an upstream port for connection to the optical fiber and a plurality of downstream ports, a plurality of optical-electrical interfaces each compatible with at least one optical communication standard and each having both an optical port connected to one of the downstream ports of the wavelength multiplexer and also an electrical port, an electrical processor component having a communication port via which the electrical processor component is arranged to emit and/or receive electrical signals (TXD, RXD), and a switch controlled by the electrical processor component and arranged to connect the communication port of the electrical processor component selectively to an electrical port of one of the optical-electrical interfaces, the electrical processor component being situated downstream from the switch.

2. The connection circuit according to claim 1, wherein each optical-electrical interface is arranged to detect the presence on the optical fiber of downlink light signals having a downlink wavelength lying within a predetermined range of downlink wavelengths associated with said optical-electrical interface in order to produce a presence signal (RXSD_A, RXSD_B) representative of the presence of said downlink light signals, and to transmit the presence signal to the electrical processor component.

3. The connection circuit according to claim 2, wherein the electrical processor component is arranged to control the switch in such a manner that, when the electrical processor component receives a presence signal coming from an optical-electrical interface, the switch connects the communication port of the electrical processor component to the electrical port of said optical-electrical interface.

4. The connection circuit according to claim 1, wherein the optical-electrical interfaces comprise a first optical-electrical interface compatible with the G-PON optical communication standard and/or a second optical-electrical interface compatible with the XG-PON optical communication standard, and/or a third optical-electrical interface compatible with the XGS-PON optical communication standard.

5. The connection circuit according to claim 1, wherein the electrical processor component includes a non-volatile memory arranged so that a connection rule can be stored in the non-volatile memory, the electrical processor component being arranged to read the connection rule in order to control the switch as a function of the connection rule.

6. An Internet gateway including a connection circuit according to claim 1.

7. A communication management method performed in a connection circuit according to claim 1, the method including a probe stage comprising steps, that are performed in succession for each optical-electrical interface, of attempting to detect the presence on the optical fiber of downlink light signals in compliance with an optical communication standard with which said optical-electrical interface is compatible, a designation stage comprising a step of designating a particular optical communication standard from a result of the probe stage, and a selection stage comprising a step of the electrical processor component operating the switch so as to connect the communication port of the electrical processor component to the electrical port of an optical-electrical interface that is compatible with the particular optical communication standard that has been designated.

8. The communication management method according to claim 7, wherein, during the probe stage, if downlink light signals potentially compatible with a plurality of optical communication standards are detected, the probe stage further comprises steps, that are performed in succession for each of said optical communication standards, of attempting to read electrical signals representative of the downlink light signals in compliance with said optical communication standards, so as to determine the correct optical communication standards with which the downlink light signals comply.

9. The communication management method according to claim 7, wherein during the probe stage, if downlink light signals potentially in compliance with a plurality of optical communication standards are detected, the probe stage further includes steps, performed in succession for each of said optical communication standards, of attempting to establish a connection in compliance with said optical communication standards between the electrical processor component and a piece of termination equipment situated upstream from the optical fiber so as to determine the correct optical communication standard with which the downlink light signals comply.

10. The communication management method according to claim 7, including a read stage prior to the probe stage, the read stage comprising a step of verifying whether a connection rule is stored in a non-volatile memory of the electrical processor component specifying a single optical communication standard that is to be used, and wherein, if such a connection rule exists, the designation stage consists of selecting a sole optical communication standard.

11. A non-transitory memory that store a computer program comprising instructions enabling the electrical processor component of an Internet gateway to perform the communication management method according to claim 7.

12. The connection circuit according to claim 1, wherein the electrical processor component is a single electrical processor component.

* * * * *